United States Patent
Offenhaeuser

(10) Patent No.: US 11,332,162 B2
(45) Date of Patent: May 17, 2022

(54) METHODS AND DEVICES FOR COMMUNICATION THAT IS COMPREHENSIVE AMONG USERS

(71) Applicant: Robert Bosch GmbH, Stuttgart (DE)

(72) Inventor: Andreas Offenhaeuser, Marbach am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 229 days.

(21) Appl. No.: 16/630,160

(22) PCT Filed: Jun. 11, 2018

(86) PCT No.: PCT/EP2018/065291
§ 371 (c)(1),
(2) Date: Jan. 10, 2020

(87) PCT Pub. No.: WO2019/015871
PCT Pub. Date: Jan. 24, 2019

(65) Prior Publication Data
US 2020/0180658 A1    Jun. 11, 2020

(30) Foreign Application Priority Data

Jul. 18, 2017 (DE) .......................... 102017212249.8

(51) Int. Cl.
*B60W 60/00* (2020.01)
*G07C 5/00* (2006.01)
(Continued)

(52) U.S. Cl.
CPC ....... *B60W 60/0051* (2020.02); *G05D 1/0061* (2013.01); *G05D 1/0088* (2013.01);
(Continued)

(58) Field of Classification Search
CPC .... B60W 60/0051; B60W 60/00; H04W 4/44; H04W 4/00; G05D 1/0061;
(Continued)

(56) References Cited

U.S. PATENT DOCUMENTS 11,062,416 B1 *   7/2021  Jang .................. G08G 1/202
2018/0362070 A1 * 12/2018  Letwin ................. G05D 1/0212
(Continued)

FOREIGN PATENT DOCUMENTS

DE    102010023603 A1    12/2011
DE    102012021282 A1    4/2014

OTHER PUBLICATIONS

International Search Report for PCT/EP2018/065291, dated Aug. 21, 2018.
(Continued)

*Primary Examiner* — Yonel Beaulieu
(74) *Attorney, Agent, or Firm* — Norton Rose Fulbright US LLP; Gerard Messina

(57) ABSTRACT

A method and device for communication that is comprehensive among users, including receiving information concerning a first state transition in an autonomous driving system from a user of the autonomous driving system, determining information concerning a state of the autonomous driving system, based on the information concerning the first state transition and at least one second state transition, and saving the information concerning the state in at least one block chain. A method and device for communication in a user that is comprehensive among users, including determining a first state transition in the autonomous driving system based on information concerning a state of the autonomous driving system, information concerning at least one second state transition in the autonomous driving system being received from at least one block chain, and the state of the autono-
(Continued)

mous driving system being determined based on the information concerning the at least one second state transition.

15 Claims, 2 Drawing Sheets

(51) Int. Cl.
  *G08G 1/01* (2006.01)
  *G08G 1/16* (2006.01)
  *H04W 4/44* (2018.01)
  *G05D 1/00* (2006.01)
  *G05D 1/02* (2020.01)
  *G08G 1/0967* (2006.01)

(52) U.S. Cl.
  CPC ........... *G05D 1/0212* (2013.01); *G07C 5/008* (2013.01); *G08G 1/0112* (2013.01); *G08G 1/0129* (2013.01); *G08G 1/0133* (2013.01); *G08G 1/0141* (2013.01); *G08G 1/096775* (2013.01); *H04W 4/44* (2018.02)

(58) Field of Classification Search
  CPC ...... G05D 1/0088; G05D 1/0212; G05D 1/00; G07C 5/008; G07C 5/00; G08G 1/0112; G08G 1/0129; G08G 1/0133; G08G 1/0141; G08G 1/096775; G08G 1/096741; G08G 1/09675; G08G 1/04; G08G 1/16; G06Q 40/08
  See application file for complete search history.

(56) References Cited

U.S. PATENT DOCUMENTS

| | | | |
|---|---|---|---|
| 2019/0101924 A1* | 4/2019 | Styler | B60W 30/0956 |
| 2019/0145765 A1* | 5/2019 | Luo | G06K 9/00791 |
| | | | 702/153 |
| 2020/0409369 A1* | 12/2020 | Zaytsev | G01C 21/3605 |
| 2021/0072034 A1* | 3/2021 | Meroux | H04L 9/0643 |
| 2021/0073287 A1* | 3/2021 | Hunter | G06F 16/9024 |
| 2021/0117697 A1* | 4/2021 | Guim Bernat | G06K 9/00771 |
| 2021/0248514 A1* | 8/2021 | Celia | G06N 3/006 |

OTHER PUBLICATIONS

Philip Ross, "Toyota Joins Coalition to Bring Blockchain Networks to Smart Cars", IEEE Spectrum, 2017, pp. 1-3, XP055499014.

Gantait Amitranjan, "Implementing Blockchain for Cognitive IoT Applications, Part 2: Use Vehicle Sensor Data to Execute Smart Transactions in Blockchain", IBM Developerworks, 2017, pp. 1-17, XP055499074. URL:https://www.ibm.com/developerworks/cloud/library/cl-blockchain-for-cognitive-iot-apps2/index .html.

Anonymous, "Blockchain", Wikipedia, 2017, pp. 1-20, XP055408908. URL:https://en.wikipedia.org/w/index.php?title=blockchain&oldid=785374674.

* cited by examiner

METHODS AND DEVICES FOR COMMUNICATION THAT IS COMPREHENSIVE AMONG USERS

FIELD

The present invention relates to a method and a device for communication that is comprehensive among users.

BACKGROUND INFORMATION

In communication that is comprehensive among users, data are exchanged via a central database in which information concerning knowledge and decisions of individual vehicles may be stored, and from which individual vehicles may retrieve this information. Such databases may be used by autonomous vehicles, for example, for exchanging information during autonomous driving.

A key factor for the success of autonomous driving is effective protection of such databases from unauthorized manipulation and unauthorized access.

SUMMARY

The present invention provides an example method for communication that is comprehensive among users. The example method includes receiving information concerning a first state transition in an autonomous driving system from a user of the autonomous driving system, determining information concerning a state of the autonomous driving system, based on the information concerning the first state transition and based on information concerning at least one second state transition in the autonomous driving system, and saving the information concerning the state in at least one block chain.

The information concerning the state preferably includes a header and information concerning the first state transition and the at least one second state transition.

At least a portion of the information concerning the state is preferably transmitted from the at least one block chain to at least one user of the autonomous driving system.

The information concerning the change of state preferably includes information concerning a trajectory of a user of the autonomous driving system, concerning an object that has been detected by a user of the autonomous driving system, concerning a decision of a user of the autonomous driving system, concerning a first user of the autonomous driving system that has been detected by a second user of the autonomous driving system, or concerning an instantaneous position of at least one user of the autonomous driving system.

Information concerning a relative or absolute position of the users is preferably exchanged among the users and with the data processing system, only portions of the block chain that are relevant for individual users due to their position being transmitted to these users.

An example method in accordance with the present invention is provided for communication in a user that is comprehensive among users. The example method includes determining a first state transition in the autonomous driving system, based on information concerning a state of the autonomous driving system, information concerning at least one second state transition in the autonomous driving system being received from at least one block chain, and the state of the autonomous driving system being determined based on the information concerning the at least one second state transition.

The information concerning the second state transition is preferably verified based on information concerning at least a portion of the state of the autonomous driving system from the at least one block chain.

The information concerning the first state transition is preferably transmitted for management in at least one block chain.

An example device for communication that is comprehensive among users in accordance with the present invention includes a receiver that is designed to receive information concerning a first state transition in the autonomous driving system from a user of the autonomous driving system, a data processing system that is designed to determine information concerning a state of the autonomous driving system, based on the information concerning the first state transition and based on information concerning at least one second state transition in the autonomous driving system, and to save the information concerning the state in at least one block chain.

The information concerning the state preferably includes a header and information concerning the first state transition and the at least one second state transition.

The example device preferably includes a transmitter that is designed to transmit at least a portion of the information concerning the state from the at least one block chain to at least one user of the autonomous driving system.

The information concerning the change of state preferably includes information concerning a trajectory of a user of the autonomous driving system, concerning an object that has been detected by a user of the autonomous driving system, concerning a decision of a user of the autonomous driving system, concerning a first user of the autonomous driving system that has been detected by a second user of the autonomous driving system, or concerning an instantaneous position of at least one user of the autonomous driving system.

An example device for communication in a user that is comprehensive among users in accordance with the present invention includes a control unit that is designed to determine a first state transition in the autonomous driving system based on information concerning a state of the autonomous driving system, the device including a receiving device that is designed to receive information concerning at least one second state transition in the autonomous driving system from a block chain, and the control unit being designed to determine the state of the autonomous driving system based on the information concerning the at least one second state transition.

The control unit is preferably designed to verify the information concerning the second state transition based on information concerning at least a portion of the state of the autonomous driving system from the block chain.

The example device preferably includes a transmitting device that is designed to transmit the information concerning the first state transition for management in a block chain.

Moreover, the present invention relates to a motor vehicle and a computer program containing instructions which when executed cause at least one of the methods to run.

Further advantageous specific embodiments are described herein and are shown in the figures.

DETAILED DESCRIPTION OF EXAMPLE EMBODIMENTS

Figure 1:
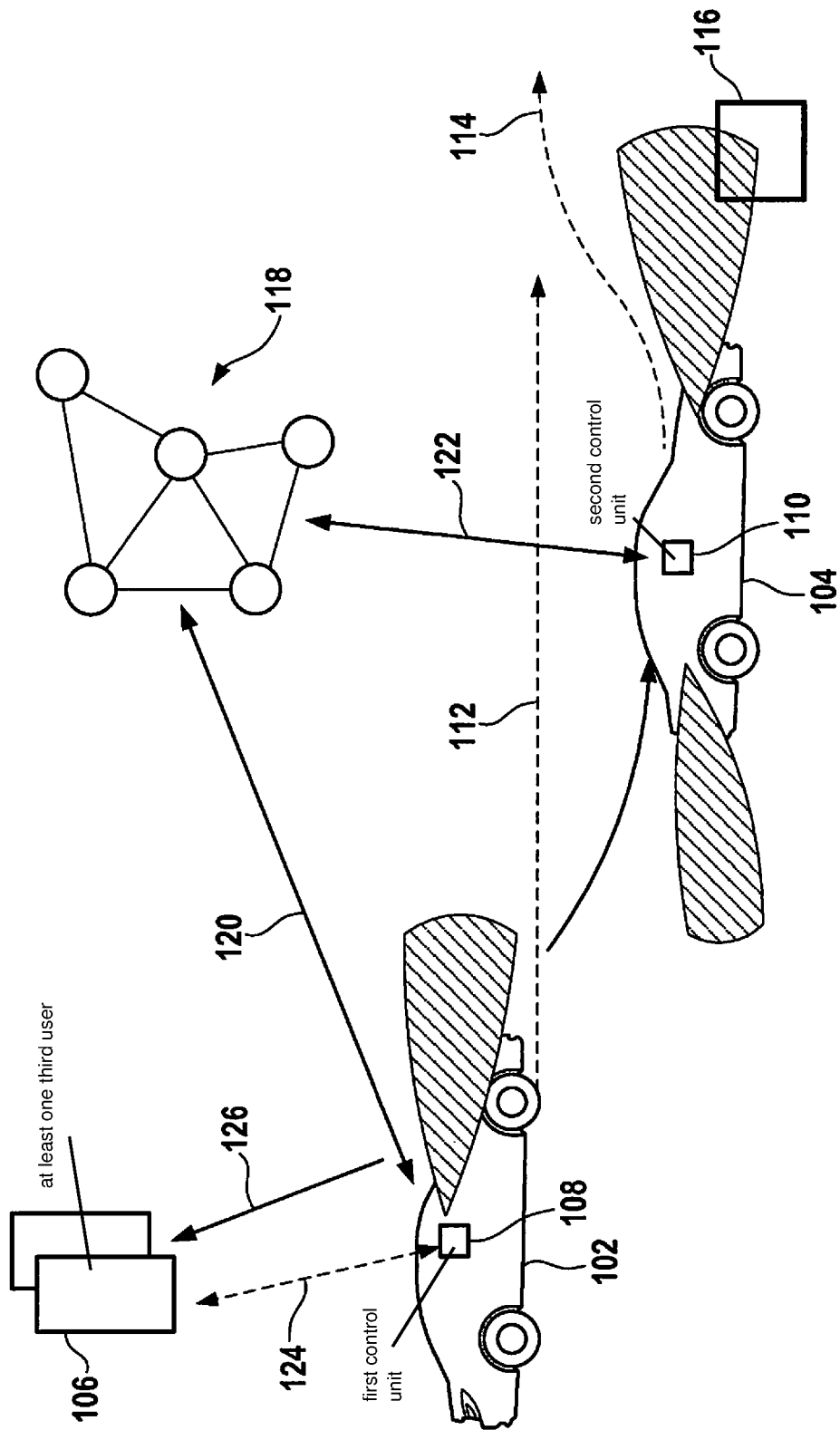
FIG. 1 schematically shows a system for autonomous driving.

FIG. 1 schematically shows a system for autonomous driving, including a first user 102, a second user 104, and at least one third user 106. More or fewer users may be provided.

First user 102 and second user 104 are vehicles, in particular motor vehicles. The at least one third user 106 is an infrastructure element, for example a part of a traffic management system, which observes a section of a road via sensors.

First user 102 and second user 104 likewise include sensors for observing their surroundings.

The sensors are, for example, sensors that observe their surroundings with the aid of radar, LIDAR, a camera, or ultrasound.

First user 102 includes a first control unit 108, and second user 104 includes a second control unit 110. First control unit 108 is designed to determine a first state transition in the autonomous driving system based on information concerning a state of the autonomous driving system. First control unit 108 is designed to determine the state of the autonomous driving system based on information concerning at least one second state transition. First user 102 includes a receiving device that is designed to receive information concerning at least one second state transition in the autonomous driving system from a block chain.

In this context, a block chain is understood to mean a database whose integrity, i.e., security against subsequent manipulation, is ensured by storing a hash value of a preceding data set in the respective subsequent data set, i.e., by cryptographic chaining. Exactly one block chain may be provided. Multiple block chains may also be provided.

In this context, a state of the autonomous driving system is understood to mean, for example, information concerning the autonomous driving system that has been detected at a detection point in time. FIG. 1 schematically illustrates such a state. In the example of the block chain, the information concerning the state includes a header and information concerning the first state transition and at least the second state transition. In the example, the header includes at least one hash value of at least one immediately preceding state of the autonomous driving system in the block chain. In the example, the header also includes a verification value, for example a Merkle root value.

The information concerning the state includes, for example, information concerning a first trajectory 112 of first user 102 or a second trajectory 114 of second user 104 at the detection point in time. The information concerning the state includes, for example, information concerning an object 116 that is detected at the detection point in time by one of the users, in the example, the second user 104, of the autonomous driving system. The information concerning the state may also include a piece of information concerning a decision of one of the users of the autonomous driving system at the detection point in time. The information concerning the state may also include a piece of information that first user 102 detects from second user 104 of the autonomous driving system at the detection point in time.

The information concerning the state may also include a piece of information concerning an instantaneous position of one of the users at the detection point in time, or information concerning the instantaneous positions of all users of the autonomous driving system in a detected section.

The information concerning the state transition includes, for example, at least in part the mentioned information concerning the state at the detection point in time. The information concerning the change of state preferably includes only information concerning changes in the state between two successive detection points in time.

First control unit 108 is optionally designed to verify the information concerning the second state transition based on information concerning at least a portion of the state of the autonomous driving system from the block chain. For this purpose, for example a validity of the first state is checked with the aid of the hash value and the verification value from the header of the first state, and information concerning at least one previous state. It may be provided to use the first state only when the verification confirms the validity of the first state.

First user 102 also includes a transmitting device that is designed to transmit the information concerning the first state transition for management in a block chain.

In the example, second user 104 has a design with respect to first control unit 102, the transmitter, and the receiving device that corresponds to first user 102.

In the example, the at least one third user 106 has a design with respect to first control unit 102 and the transmitter that corresponds to first user 102.

In the example, the block chain is stored and processed in a distributed data processing system 118. A central data processing system may also be provided.

A device for communication that is comprehensive among users of an autonomous driving system includes data processing system 118. The device also includes a receiver that is designed to receive information concerning the first state transition in the autonomous driving system from at least one of the users of the autonomous driving system. Data processing system 118 is also designed to determine information concerning the state of the autonomous driving system, based on the information concerning the first state transition and based on information concerning the at least one second state transition in the autonomous driving system, and to save the information concerning the state in at least one block chain.

In the example, the information concerning the state includes the header and information concerning the first state transition and the at least one second state transition.

The device also includes a transmitter that is designed to transmit at least a portion of the information concerning the state from the at least one block chain to at least one of the users of the autonomous driving system.

First user 102 is connectable to data processing system 118 via a first data line 120. Second user 104 is connectable to data processing system 118 via a second data line 122. In the example, the at least one third user 106 is connectable to first user 102 via at least one third data line 124. In the example, the at least one third user 106 is connectable to second user 104 via at least one fourth data line 126. A connection may also be provided directly between first user 102 and second user 104, or between the at least one third user 106 and data processing system 118. The mentioned connections are based, for example, on the Long-Term Evolution standard 3GPP LTE Release 12 or some other wireless communication link.

Figure 2:
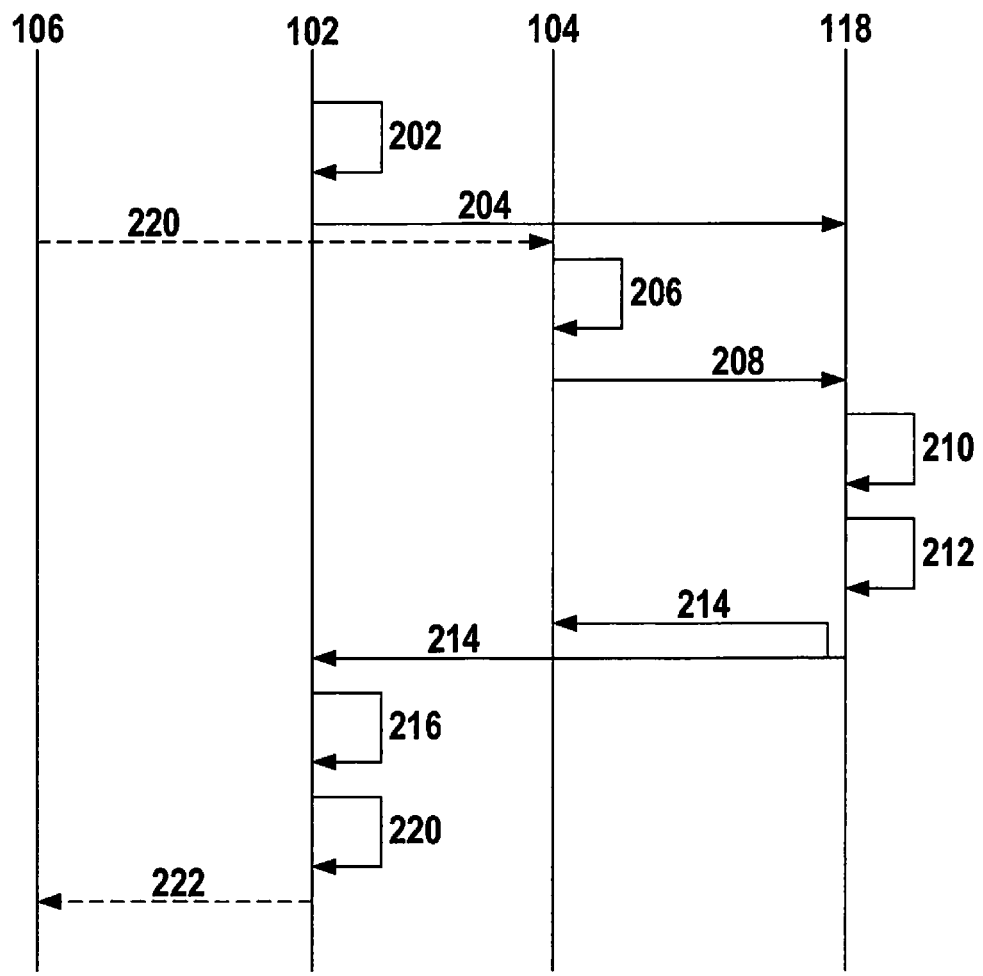
FIG. 2 shows a signal flow chart with steps of a method for communication that is comprehensive among users.

A method for communication that is comprehensive among users during autonomous driving is described below with reference to FIG. 2.

First user 102 determines information concerning the first state transition in the autonomous driving system, based on information concerning the state of the autonomous driving system, in a step 202.

Information concerning a first state transition is transmitted in a message 204 from first user 102 to data processing system 118.

Second user 102 determines information concerning the second state transition in the autonomous driving system, based on information concerning the state of the autonomous driving system, in a step 206.

Information concerning a second state transition is transmitted in a message 208 from second user 104 to data processing system 118.

Information concerning the state of the autonomous driving system is determined, based on the information concerning the first state transition and based on information concerning the second state transition, in a step 210.

Additional state transitions of second user 104 or of other users of the autonomous driving system may also be received as further second state transitions. This means that in the example, at least one second state transition is received.

The information concerning the state is saved in at least one block chain in a step 212. For this purpose, for example information concerning the state is ascertained as a new block of the block chain, together with an associated header from the first state transition, the second state transition, and further state transitions, already available, of other users of the autonomous driving system. The information concerning the state includes the header, and information concerning the first state transition and the at least one second state transition.

At least a portion of the information concerning the state is transmitted from the at least one block chain to at least one user of the autonomous driving system in a message 214. In the example, message 210 is transmitted as a multicast message to first user 102 and to second user 104.

In the example, first user 102 verifies the information from message 214 concerning the second state transition, based on information concerning at least a portion of the state of the autonomous driving system from the at least one block chain, in a step 216. In the example, second user 104 does not verify message 214. It may also be provided that second user 104 verifies message 214.

A new first state transition in the autonomous driving system is subsequently determined from message 214, based on the information concerning the state of the autonomous driving system, in a step 218. In this message, information concerning the at least one second state transition in the autonomous driving system is received from the block chain, and the new state of the autonomous driving system is determined based on the information concerning the at least one second state transition.

In this example, second user 104 determines no new state from message 214. It may also be provided that second user 104 determines a new state.

The at least one third user 106 may optionally transmit information for determining the first change of state or the second change of state to first user 102 or to second user 104. This is illustrated as a dashed-line message 218 in FIG. 2 for the example prior to determining the second change of state in step 206. The state is optionally transmitted to third user 106 via a message 220 illustrated as a dashed line in FIG. 2, from first user 102 after receipt of message 214.

The following steps are subsequently repeated in the example.

Information concerning a relative or absolute position of the users is preferably also exchanged among the users and with the data processing system 118. In this case, it may be provided that only portions of the block chain that are relevant for an individual user due to their position, i.e., their distance from one another falls below a predefined value, are transmitted to individual users. The information concerning the relative or absolute position is exchanged, for example, via a connection of the users to a server system.

Data processing system 118 and the server system may have a centralized or decentralized design.

A decision of a user, for example second user 104, to select second trajectory 114 instead of an old, previously transmitted second trajectory, which in the example extended straight ahead through the location of object 116, in order to avoid object 116 is provided as a second change of state to first user 102 via the block chain. As soon as the second change of state is part of the block chain, this information can no longer be manipulated. The same applies for first trajectory 112, which first user 102 has transmitted as a first change of state. The overall process may thus be reliably and credibly reconstructed. In addition, due to the reliability of the block chain, first user 102 may trust that second trajectory 114 actually originates from second user 104. The first user's own decision of how to respond to second trajectory 114 is thus likewise based on reliable information. The same applies for information from the at least one third user 106. Furthermore, first user 102 is thus also informed about object 116 without itself having detected information concerning object 116 via the mentioned sensors.

Thus, also in the event of an accident the question may be clarified as to which pieces of information were the basis for the vehicle's actions, and by the interlinking of all vehicles with a block chain link that contains a chronological sequence of successive states, it may also be clarified as to where incorrect pieces of information originated. In particular, by evaluating the contents of the block chain, a decision may be made as to whether second user 104 has incorrectly recognized/classified object 116, second user 104 itself has incorrectly taken action, first user 102 has taken an incorrect action based on the information from second user 104, first user 102, based on incorrect information from one of the at least one third users 106, has incorrectly classified second user 104 as a relevant information source.

If planned actions of a vehicle or its planning level are/is also stored in the block chain, applications of cooperative driving may thus also be covered.

Due to the trustworthy, unmodifiable data storage, this system also provides a reliable basis for juridical discussions.

In addition, the control units may regularly store states of the block chain or detected knowledge about the surroundings or the control units' own decisions.

Access rights to information from the block chain may be configurable. Depending on the application, the trust in the system may be additionally increased by limiting access to the block chain. For example, for this purpose a cryptographic key is used which allows a user to transmit the changes of state in an encrypted manner, and which thus prevents the readability of the states by unauthorized persons. This encryption does not adversely affect the headers, which in this case are transmitted unencrypted to allow verification of a state contained in this change of state. By use of cryptographic key pairs, other users may be granted access to encrypted changes of state in a targeted manner without this information being available to all the other users of the block chain.

A computer program or multiple computer programs include(s) instructions that may run on the particular user and the data processing system 118 in order to carry out the particular method.

What is claimed is:

1. A method for communication that is comprehensive among users in an autonomous driving system, the autonomous driving system including a plurality of motor vehicles and a data processing system, the method comprising the following steps:
   receiving, by the data processing system via a wireless communication link, information concerning a first state transition in the autonomous driving system from a first motor vehicle of the plurality of motor vehicles of the autonomous driving system;
   determining, by the data processing system, information concerning a state of the autonomous driving system, based on the information concerning the first state transition and based on information concerning at least one second state transition in the autonomous driving system;
   saving, by the data processing system, the information concerning the state in at least one block chain; and
   wirelessly transmitting, via a transmitter, at least part of the information concerning the state from the at least one block chain to at least one of the plurality of motor vehicle of the autonomous driving system.

2. The method as recited in claim 1, wherein the information concerning the state includes a header and information concerning the first state transition and the at least one second state transition.

3. The method as recited in claim 1, wherein the information concerning the first state transition and/or the information concerning the second state transition includes: information concerning a trajectory of one of the motor vehicles of the autonomous driving system, or information concerning an object that has been detected by one of the motor vehicle of the autonomous driving system, or information concerning a decision of one of the motor vehicles of the autonomous driving system, or information concerning one of the motor vehicles of the autonomous driving system that has been detected by another one of the motor vehicles of the autonomous driving system, or information concerning an instantaneous position of at least one of the motor vehicles of the autonomous driving system.

4. The method as recited in claim 1, wherein information concerning a relative or absolute position of the motor vehicles is wirelessly exchanged among the motor vehicles and with the data processing system, only portions of the block chain that are relevant for individual ones of the motor vehicles due to a respective position of the individual ones being transmitted to the individual ones of the motor vehicles.

5. A method for communication in a first motor vehicle that is comprehensive among a plurality of motor vehicle in an autonomous driving system, the autonomous driving system including a plurality of motor vehicles and a data processing system, the method comprising the following steps:
   determining, by the first motor vehicle, a first state transition in the autonomous driving system based on information concerning a state of the autonomous driving system;
   wirelessly receiving, by the first motor vehicle from the data processing system via a wireless communication link, information concerning at least one second state transition in the autonomous driving system from at least one block chain; and
   determining, by the first motor vehicle, the state of the autonomous driving system based on the information concerning the at least one second state transition.

6. The method as recited in claim 5, wherein the information concerning the second state transition is verified by the first motor vehicle based on information concerning at least a portion of the state of the autonomous driving system from the at least one block chain.

7. The method as recited in claim 5, wherein the information concerning the first state transition is wirelessly transmitted from the first motor vehicle to the data processing system for management in one block chain.

8. A device for communication that is comprehensive among a plurality of motor vehicles in an autonomous driving system, the device comprising:
   a receiver configured to wirelessly receive information concerning a first state transition in the autonomous driving system from a first motor vehicle of the plurality of motor vehicles of the autonomous driving system;
   a data processing system configured to determine information concerning a state of the autonomous driving system, based on the information concerning the first state transition and based on information concerning at least one second state transition in the autonomous driving system, and to save the information concerning the state of the autonomous driving system in at least one block chain; and
   a transmitter configured to wirelessly transmit at least a portion of the information concerning the state of the autonomous driving system from the at least one block chain to at least one of the plurality of motor vehicles of the autonomous driving system.

9. The device as recited in claim 8, wherein the information concerning the state includes a header and information concerning the first state transition and the at least one second state transition.

10. The device as recited in claim 8, wherein the information concerning the first state transition and/or information concerning the second state transition includes: information concerning a trajectory of one of the motor vehicles of the autonomous driving system, or information concerning an object that has been detected by one of the motor vehicles of the autonomous driving system, or information concerning a decision of one of the motor vehicles of the autonomous driving system, or information concerning one of the motor vehicles of the autonomous driving system that has been detected by another one of the motor vehicles of the autonomous driving system, or information concerning an instantaneous position of at least one of the motor vehicles of the autonomous driving system.

11. A device for communication in a user that is comprehensive among users, the device comprising:
   a control unit configured to determine a first state transition in an autonomous driving system based on information concerning a state of the autonomous driving system; and a receiver configured to receive information concerning at least one second state transition in the autonomous driving system from a block chain;

wherein the control unit is configured to determine the state of the autonomous driving system based on the information concerning the at least one second state transition.

12. The device as recited in claim 11, wherein the control unit is configured to verify the information concerning the second state transition based on information concerning at least a portion of the state of the autonomous driving system from the block chain.

13. The device as recited in claim 11, further comprising:

a transmitter configured to transmit the information concerning the first state transition for management in the block chain.

14. A motor vehicle including a device for communication in a user that is comprehensive among users, the device comprising:

a control unit configured to determine a first state transition in an autonomous driving system based on information concerning a state of the autonomous driving system; and a receiver configured to receive information concerning at least one second state transition in the autonomous driving system from a block chain;

wherein the control unit is configured to determine the state of the autonomous driving system based on the information concerning the at least one second state transition.

15. A non-transitory computer-readable memory medium on which is stored a computer program for communication that is comprehensive among users in an autonomous driving system, the autonomous driving system including a plurality of motor vehicles and a data processing system, the computer program, when executed by a computer, causing the computer to perform the following steps:

receiving, by the data processing system via a wireless communication link, information concerning a first state transition in the autonomous driving system from a first motor vehicle of the plurality of motor vehicles of the autonomous driving system;

determining, by the data processing system, information concerning a state of the autonomous driving system, based on the information concerning the first state transition and based on information concerning at least one second state transition in the autonomous driving system;

saving, by the data processing system, the information concerning the state in at least one block chain; and wirelessly transmitting, via a transmitter, at least part of the information concerning the state from the at least one block chain to at least one of the plurality of motor vehicle of the autonomous driving system.

* * * * *